(12) United States Patent
Seo

(10) Patent No.: US 7,577,201 B2
(45) Date of Patent: Aug. 18, 2009

(54) APPARATUS AND METHOD FOR CONVERTING RESOLUTION OF COMPRESSED VIDEO

(75) Inventor: Kwang-Deok Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 103 days.

(21) Appl. No.: 10/989,669

(22) Filed: Nov. 17, 2004

(65) Prior Publication Data

US 2005/0111546 A1  May 26, 2005

(30) Foreign Application Priority Data

Nov. 24, 2003  (KR) .................. 10-2003-0083743

(51) Int. Cl.
*H04N 7/18*  (2006.01)
(52) U.S. Cl. .............. 375/240.16; 375/240.25; 375/240.26; 375/240.17
(58) Field of Classification Search ................ 375/240.01–240.29
See application file for complete search history.

(56) References Cited

U.S. PATENT DOCUMENTS

| | | | |
|---|---|---|---|
| 5,940,130 A * | 8/1999 | Nilsson et al. ........ | 375/240.12 |
| 6,434,197 B1 * | 8/2002 | Wang et al. .......... | 375/240.29 |
| 6,456,661 B1 * | 9/2002 | Morel ................ | 375/240.16 |
| 6,466,623 B1 * | 10/2002 | Youn et al. .......... | 375/240.16 |
| 6,526,099 B1 * | 2/2003 | Christopoulos et al. | 375/240.26 |
| 6,671,322 B2 * | 12/2003 | Vetro et al. .......... | 375/240.16 |
| 6,704,358 B1 * | 3/2004 | Li et al. ............ | 375/240.02 |
| 6,868,188 B2 * | 3/2005 | Skodras et al. ....... | 382/250 |
| 7,142,601 B2 * | 11/2006 | Kong et al. .......... | 375/240.16 |
| 7,180,944 B2 * | 2/2007 | Lin et al. ........... | 375/240.16 |
| 2003/0227974 A1 * | 12/2003 | Nakamura et al. ..... | 375/240.25 |

FOREIGN PATENT DOCUMENTS

| | | |
|---|---|---|
| EP | 1 257 127 A2 | 11/2002 |
| KR | 2002-0013983 | 2/2002 |
| KR | 2003-0012276 | 2/2003 |

OTHER PUBLICATIONS

Chinese Office Action dated Aug. 18, 2006.

* cited by examiner

*Primary Examiner*—Andy S Rao
(74) *Attorney, Agent, or Firm*—KED & Associates, LLP

(57) ABSTRACT

An apparatus for converting a resolution of video including a decoding unit configured to convert a first resolution of a video signal to a second resolution according to a predetermined ratio, to scale a motion vector extracted from the video signal based on the predetermined ratio, and to compensate the scaled motion vector. Also included is a coding unit configured to code a signal output from the decoding unit.

19 Claims, 2 Drawing Sheets

APPARATUS AND METHOD FOR CONVERTING RESOLUTION OF COMPRESSED VIDEO

CROSS-REFERENCE TO A RELATED APPLICATION

This application claims priority to Korean patent application No. 83743/2003, filed on Nov. 24, 2003, the entire contents of which is hereby incorporated in its entirety.

BACKGROUND OF THE INVENTION

1. Field of the Invention

The present invention relates to a video processing apparatus, and more particularly to an apparatus and method for converting a resolution of a compressed video and for scaling down a resolution of the video contents.

2. Background of the Related Art

In general, mobile terminals include LCDs with a variety of different resolutions. Thus, video information to be displayed on the LCD must be converted to match the resolution of the LCD being used. Therefore, the resolution of video information often needs to be converted to a new resolution. Further, because the resolution of the displays in mobile terminals is generally less than a resolution of a video to be displayed, the resolution of the video information is down converted using a resolution converter, for example.

There are generally two types of resolution converters: one is an open-loop converter and the other is a closed-loop converter.

First, an example of an open-loop converter will be described with reference to FIG. 1. As shown, the open-loop converter includes a VLD (Variable Length Decoding) unit 11 for decoding a variable length of a video signal; a de-quantizer 12 for de-quantizing an output signal of the VLD unit 11; a down-sampling filter 13 for scaling down a resolution of a signal output from the de-quantizer 12; a quantizer 14 for quantizing an output signal of the down-sampling filter 13; a VLC (Variable Length Coding) unit 15 for coding a variable length of an output signal of the quantizer 14; and a motion vector re-sampler 16 for scaling down a motion vector of the input video signal. Note, a resolution scale-down ratio of the down-sampling filter 13 is the same as a motion vector scale-down ratio of the motion vector re-sampler 16.

The open-loop converter has a simple structure because a motion vector is not compensated when de-quantizing and quantizing the video signal. However, when continuously input P-frames are converted into a lower resolution, an error is accumulated and drifted, which degrades the picture quality. Namely, an error in one frame may not significantly affect the picture quality, but when the error is accumulated and drifted to other frames, the picture quality becomes more and more degraded. This type of problem is called an error drift problem.

The closed-loop converter is shown in FIG. 2 and is used to address the error drift problem of the open-loop converter shown in FIG. 1. As shown in FIG. 2, the closed-loop converter includes a decoding unit 19 for decoding an input video signal in DCT (Discrete Cosine Transform) units; a down-sampling filter 26 for scaling down a resolution of a signal output from the decoding unit 19; and a coding unit 20 for compensating a video signal output from the down-sampling filter 26 with a final motion vector and coding the compensated video signal.

The decoding unit 19 includes a VLD unit 21 for decoding a variable length of the video signal; a de-quantizer 22 for de-quantizing a signal output from the VLD unit 21; a first motion vector compensating unit 23 for compensating a motion vector using a motion vector input through the VLD unit 21; a first frame memory 24 for storing a signal restored as a DCT coefficient value by adding the motion vector compensated by the first motion vector compensating unit 23 and an output signal of the de-quantizer 22; and a motion vector re-sampler 25 for scaling down a motion vector of the video signal input through the VLD unit 21.

In addition, the first motion vector compensating unit 23 compensates a motion vector using a signal stored in the first memory 24 as a reference frame. The motion vector re-sampler 25 calculates a final motion vector ($V_n$) using a general known method (rather than estimating the motion vector).

Next, the operation of the closed-loop converter will be described. When an I-frame is input to the closed-loop converter, the frame is decoded in its variable length through the VLD unit 21 and then restored to DCT coefficients through the de-quantizer 22. The VLD unit 21 also extracts various supplementary information (e.g., header information, motion information, etc.) from the I-frame.

A signal corresponding to the restored DCT coefficient is $X_n^c$. The $X_n^c$ signal is input to the down-sampling filter 26 and becomes an $X_n$ signal with a scaled-down resolution. Further, the $X_n$ signal is then compressed in the coding unit 20. The $X_n^c$ signal for the I-frame is also stored in the first frame memory 24, and is used as a reference frame for compensating a motion of a P-frame input after the I-frame.

Further, when the P-frame is input to the closed-loop converter, a result value obtained by performing a motion compensation on the P-frame based on the DCT coefficient value of a previous frame stored in the first frame memory 24 and an error signal $E_n^c$ of the P-frame output through the VLD unit 21 and the de-quantizer 22 are added to restore the DCT coefficient value $X_n^c$. The restored DCT coefficient value $X_n^c$ is then input to the down-sampling filter 26 and becomes the $X_n$ signal with the scaled-down resolution. The $X_n$ signal then compressed in the coding unit 20.

As mentioned above, the closed-loop converter reduces the error drift by compensating the motion vector. However, the structure of the closed-loop converter is more complex than the open-loop converter.

SUMMARY OF THE INVENTION

Accordingly, one object of the invention is to address at least the above problems and/or disadvantages and to provide at least the advantages described hereinafter.

Another object of the present invention is to simplify the structure of the complex closed-loop converter while maintaining a superior performance.

To achieve at least the above and other objects in whole or in parts, the present invention provides a novel apparatus for converting a resolution of video including a decoding unit configured to convert a first resolution of a video signal to a second resolution according to a predetermined ratio, to scale a motion vector extracted from the video signal based on the predetermined ratio, and to compensate the scaled motion vector. The apparatus also includes a coding unit configured to code a signal output from the decoding unit. The present invention also provides a novel converting method.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE OF THE INVENTION

An apparatus and method for converting a resolution of video according to the present invention will now be described with reference to the accompanying drawings.

The apparatus for converting a resolution of video according to the present invention advantageously reduces a complexity of the structure of the related art closed-loop converter and also reduces the amount of calculations required for processing video signals while maintaining or exceeding the performance of the related art closed-loop converter.

As discussed above and with reference to FIG. 2, the related art closed-loop converter includes the decoding unit 19, the down-sampling filter 26 for scaling down the resolution of the signal $X_n^c$ output from the decoding unit 19 and the coding unit 20 for coding the signal $X_n$ output from the down-sampling filter 26.

Figure 1:
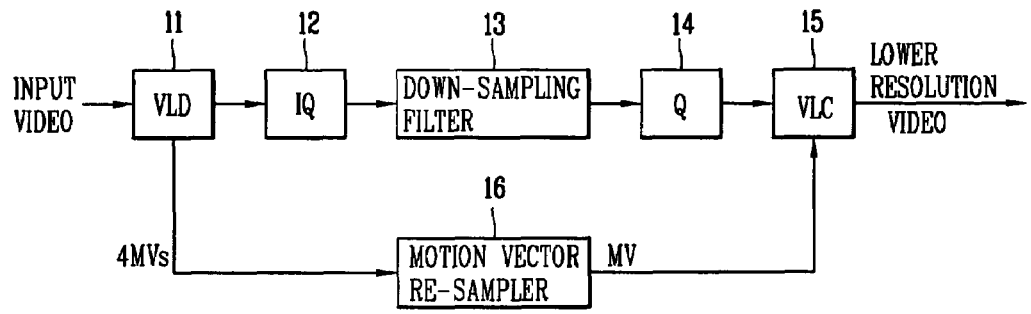
FIG. 1 is a block diagram illustrating a related art open-loop converter.
Figure 2:
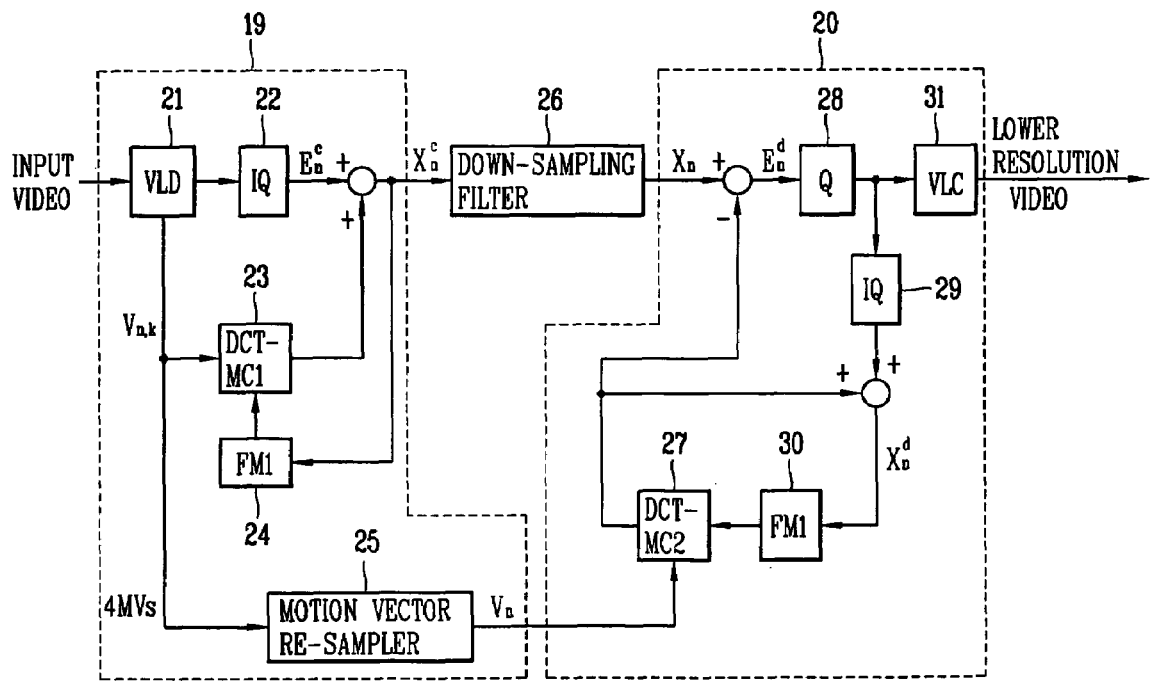
FIG. 2 is a block diagram illustrating a related art closed-loop converter.

The coding unit 20 in FIG. 2 also includes a second motion vector compensating unit 27 for compensating a motion using a motion vector applied after being scaled down at a certain ratio from the motion vector re-sampler 25; a quantizer 28 for quantizing a signal obtained by adding the motion vector compensated in the second motion vector compensating unit 27 and the signal output with its scaled-down resolution from the down-sampling filter 26; a second frame memory 30 for storing a signal obtained by adding a signal, which is obtained by de-quantizing a signal output from the quantizer 28, through the de-quantizer 29 of the coding unit 20 and the motion vector compensated in the second motion vector compensating unit 27; and a VLC 31 for coding a variable length of an output signal of the quantizer 28. Further, the second motion vector compensating unit 27 compensates the reference frame stored in the second frame memory 30 using a final motion vector output from the motion vector re-sampler 25.

Further, the signal $E_n^d$ input to the quantizer 28 can be expressed by equation (1) shown below:

$$E_n^d = X_n - Mc(X_{n-1}^d, V_n) \tag{1}$$

where Mc means a general motion vector compensation by the second motion vector compensating unit 27, and the final motion vector used for the motion vector compensation is $V_n$. Note, $V_n$ is calculated by re-estimating a motion vector $V_{n,k}$ of a video signal input to the resolution converter through the motion vector re-sampler 25. In this instance, general known methods may be used as the motion vector re-estimating method.

The video signal $X_n$ output from the down-sampling filter 26 after its resolution is scaled down and motion vector is compensated can be expressed by equation (2) as shown below:

$$X_n = D[E_n^c + Mc(X_{n-1}^c, V_{n,k})] \tag{2}$$

where $E_n^c$ is an error signal of the P-frame, 'D' means down-sampling filtering, Mc means motion vector compensation by the first motion vector compensating unit 23 and a motion vector used for the motion vector compensation is $V_{n,k}$. Namely, the video signal $X_n$ of the current frame is a signal obtained by compensating a motion vector of a video signal $X_{n-1}^c$ of a previous frame, adding it with the error signal $E_n^c$ and then scaling down its resolution through the down-sampling filter 26.

By substituting equation (2) into equation (1), equation (3) shown below can be obtained:

$$E_n^d = D[E_n^c + Mc(X_{n-1}^c, V_{n,k})] - Mc(X_{n-1}^d, V_n) \tag{3}$$

Because 'D' is a linear operator, equation (3) can be expressed as equation (4) shown below:

$$E_n^d = D[E_n^c] + D[Mc(X_{n-1}^c, V_{n,k})] - Mc(X_{n-1}^d, V_n) \tag{4}$$

Because 'D' and 'Mc' at the second term of equation (4) are linear operators in which their order can be changed, equation (4) can be expressed by equation (5) shown below:

$$E_n^d = D[E_n^c] + Mc(D[X_{n-1}^c], V_{n,k}^s) - Mc(X_{n-1}^d, V_n) \tag{5}$$

where $V_{n,k}^s$ is a value obtained by scaling down the motion vector $V_{n,k}$ of the input video signal in accordance with a resolution scale-down ratio of the down-sampling filter 26. Namely, when the resolution of the input video signal is scaled down by ½ in its width and length, respectively, $V_{n,k}^s$ becomes $V_{n,k}/2$.

The first and second parts in equation (5) are performed by the decoding unit 19 and the down-sampling filer 26 of the resolution converter, while the third part is performed by the coding unit 20.

Comparing equation (4) and equation (5), it can be seen the process performed in the coding unit is the same, and note the process performed by the decoding unit 19 and the down-sampling filter 26 is different at a point when the down-sampling filter is applied.

Figure 3:
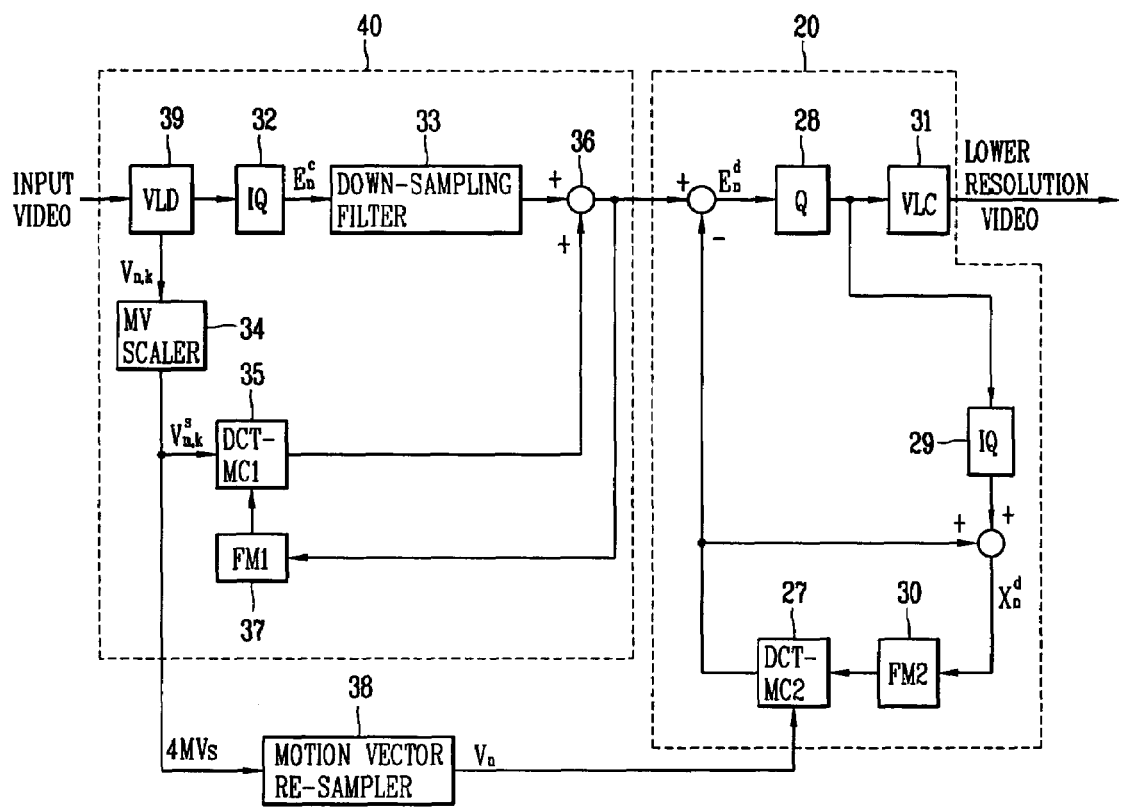
FIG. 3 is a block diagram illustrating an apparatus for converting a resolution of video according to the present invention.

Next, FIG. 3 is a block diagram showing an apparatus for converting a resolution of a compressed video according to the present invention. The apparatus of the present invention also solves equation (5), but advantageously has a simplified structure. In more detail, as shown, the apparatus includes a decoding unit 40 for decoding an input video signal to obtain a signal with a scaled-down resolution, combining the resolution scaled-down signal with a signal obtained by compensating a motion vector of the video signal, and outputting the signal. The apparatus also includes the coding unit 20 shown in FIG. 2, and accordingly the details of the coding unit will not be reiterated.

The decoding unit 40 includes a down-sampling filter 33 for converting a resolution of a video signal which has been decoded into DCT units through a VLD unit 39 and a de-quantizer 32; a motion vector scaler 34 for scaling down the motion vector $V_{n,k}$ extracted through the VLD unit 39 in accordance with a resolution scale-down ratio; a first motion vector compensating unit 35 for compensating the motion vector at a DCT region using the scale-downed motion vector $V_{n,k}^s$; a combiner 36 for combining the signal compensated through the first motion vector compensating unit 35 and the signal whose resolution has been scaled down through the down-sampling filter 33; and a first frame memory 37 for storing a video signal output from the combiner 36 as a reference frame for compensating a motion vector of the next frame.

Further, a motion vector re-sampler 38 provides a final motion vector $V_n$ to the coding unit 20 from the decoding unit 40. Note, a motion vector $V_{n,k}^s$ obtained by scaling down the motion vector $V_{n,k}$ extracted through the VLD unit 31 in accordance with the resolution scale-down ratio is also input.

Further, each motion vector extracted from an input video signal is input as it is in the related art resolution converter, but in the present invention, each motion vector is input to the motion vector re-sampler 38.

Another difference between the related art closed-loop converter shown in FIG. 2 and the resolution converter according to the present invention shown in FIG. 3 is a position of the down-sampling filter 33. Namely, a point when the resolution conversion filter is applied is different.

In the resolution converter according to the present invention, the resolution of the video signal is scaled down before its motion vector is compensated through the first motion vector compensating unit 35. Namely, the resolution of the video signal is converted in advance, and then the motion vector is compensated.

An operation of the apparatus for converting a resolution of video in according to the present invention will now be described.

An input video signal is restored to a value of a DCT coefficient through the VLD unit 39 and the de-quantizer 32, and then output as a resolution scaled-down signal from the down-sampling filter 33. The motion vector of the input video signal extracted by the VLD unit 31 is scaled down in the same amount as the resolution scale-down ratio of the down-sampling filter 33 through the motion scaler 34, and then input to the first motion vector compensating unit 35 and the motion vector re-sampler 38.

The first motion vector compensating unit 35 compensates the motion vector output from the motion scaler 34 using a signal stored in the first frame memory 37, adds it to the resolution scaled-down signal through the down-sampling filter 33, and then transmits the signal to the first frame memory 37 and the coding unit 20. At this time, the resolution scaled-down signal is stored in the first frame memory 37 and is used as a reference signal for compensating a motion vector of a video signal of the next frame.

In the apparatus for converting a resolution of video according to the present invention, a resolution of the input video signal is scaled down through the down-sampling filter 33 and then the motion vector is compensated through the first motion vector compensating unit 35, so the size of the video signal stored in the first frame memory 37 is scaled down as much as the resolution scale-down ratio. In addition, the number of times of driving the first motion vector compensating unit 35 in accordance with the resolution scale-down ratio.

For example, if the resolution scale-down ratio is ½ in width and length, the size of the first frame memory 37 is reduced to ¼ of the size of the related art frame memory, and the amount of calculation by the first motion vector compensating unit 35 is also reduced to ¼ the amount of calculation of the related art.

As so far described, the apparatus and method for converting a resolution of video according to the present invention have the following advantages.

When video contents having a specific resolution are scaled down, a smaller frame memory can be used than the related art resolution conversion apparatus.

In addition, a smaller amount of calculations are performed compared to the related art resolution converter, and thus the video contents can be scaled down in resolution at a high speed. The complexity of this apparatus/method according to the present invention are also advantageously simplified.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art. The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for converting a resolution of video, comprising:

a decoder configured to convert a first resolution of a video signal into a second resolution according to a predetermined ratio, to scale a motion vector extracted from the video signal based on the predetermined ratio by a motion vector scaler within the decoder, to compensate the scaled motion vector using a signal stored as a reference frame, to combine the compensated scaled motion vector and the resolution converted video signal, and to store a signal that has been scaled down according to the predetermined ratio;

a coder configured to code a combined signal output from the decoder, wherein the predetermined ratio is a resolution scale down ratio, and wherein when the predetermined ratio is 1/n in width and in length, respectively, a capacity of the signal is scaled down to $1/n^2$; and a motion vector re-sampler configured to receive the scaled motion vector from the decoder, to calculate a final motion vector based on the received scaled motion vector and to provide the calculated final motion vector to the coder, wherein the motion vector re-sampler is provided between the decoder and the coder.

2. The apparatus of claim 1, wherein the decoder comprises:

a variably length decoder and a dequantizer configured to decode the video signal;

a down-sampling filter configured to convert the first resolution of the decoded signal to the second resolution;

a motion vector scaler configured to scale the extracted motion vector based on the predetermined ratio;

a motion vector compensator configured to compensate the scaled motion vector at a DCT region;

a combiner configured to combine the compensated scaled motion vector and the resolution converted video signal; and a frame memory configured to store the combined signal as a second reference frame for compensating a motion vector of a next frame.

3. The apparatus of claim 2, wherein the predetermined ratio is a resolution scale down ratio of the down-sampling filter.

4. The apparatus of claim 2, wherein the frame memory stores the signal that has been scaled down according to the predetermined ratio, the predetermined ratio being a resolution scale down ratio of the down-sampling filter.

5. A method for converting a resolution of video, comprising:
converting a first resolution of a video signal into a second resolution according to a predetermined ratio;
scaling a motion vector extracted from the video signal based on the predetermined ratio at a motion vector scaler of a decoding unit;
compensating the scaled motion vector using a signal stored as a reference frame,
wherein the predetermined ratio is a resolution scale down ratio, and
wherein when the predetermined ratio is 1/n in width and in length, respectively, a capacity of the signal is scaled down to $1/n^2$;
providing the scaled motion vector from the decoding unit to a motion vector re-sampler that is located external to the decoding unit;
re-sampling, at the motion vector re-sampler, the scaled motion vector extracted from the video signal based on the predetermined ratio to calculate a final motion vector; and
inputting the calculated final motion vector to a coding unit from the motion vector re-sampler that is located external to the decoding unit.

6. The method of claim 5, further comprising:
combining the converted video signal of the second resolution and the compensated scaled motion vector into a decoding signal; and
coding the decoded signal.

7. The method of claim 5, further comprising:
storing a signal that has been scaled down according to the predetermined ratio.

8. An apparatus for converting a resolution of a video, comprising:
a variably length decoder and a first de-quantizer, provided within a decoding unit, configured to decode a video signal;
a down-sampling filter, provided within the decoding unit, configured to convert a first resolution of the decoded signal to a second resolution according to a predetermined ratio;
a motion vector scaler, provided within the decoding unit, configured to scale an extracted motion vector based on the predetermined ratio;
a first motion vector compensator, provided within the decoding unit, configured to compensate the scaled motion vector at a DCT region based on a first reference frame;
a first combiner configured to combine the compensated scaled motion vector from the first motion vector compensator and the resolution converted video signal from the down-sampling filter;
a first frame memory configured to store the combined signal from the first combiner as a second reference frame for compensating a motion vector of a next frame,
wherein the predetermined ratio is a resolution scale down ratio of the down-sampling filter, and
wherein when the predetermined ratio is 1/n in width and in length, respectively, a capacity of the signal is scaled down to $1/n^2$; and a motion vector re-sampler, provided external to the decoding unit and external to a coding unit, to receive the scaled motion vector from the decoding unit, and to calculate a final motion vector based on the scaled motion vector received from the motion vector scaler within the decoding unit, wherein the motion vector re-sampler is provided between the decoding unit and the coding unit.

9. The apparatus of claim 8, wherein the first frame memory stores a signal that has been scaled down according to the predetermined ratio.

10. A method for converting a resolution of a video, comprising:
decoding and de-quantizing a video signal;
converting a first resolution of the decoded signal to a second resolution according to a predetermined ratio;
scaling an extracted motion vector of the video signal based on the predetermined ratio at a motion vector scaler of a decoding unit;
compensating the scaled motion vector at a DCT region based on a first reference frame;
combining the compensated scaled motion vector and the resolution converted video signal into a second resolution decoding signal;
storing the combined signal as a second reference frame for compensating a motion vector of a next frame,
wherein the predetermined ratio is a resolution scale down ratio, and
wherein when the predetermined ratio is 1/n in width and in length, respectively, a capacity of the signal is scaled down to $1/n^2$;
outputting the scaled motion vector from the decoding unit to a motion vector re-sampler located external to the decoding unit;
re-sampling, at the motion vector re-sampler, the scaled motion vector extracted from the video signal based on the predetermined ratio to calculate a final motion vector; and
inputting the calculated final motion vector to a coding unit.

11. The apparatus of claim 1, wherein the coder comprises:
a motion vector compensator configured to compensate the final motion vector at a DCT region based on a second reference frame;
a first combiner configured to combine the compensated final motion vector from the motion vector compensator and the combined signal output from the decoder;
a quantizer configured to quantize the combined signal from the first combiner; and
a variable length coder configured to code the quantized signal from the quantizer into a converted resolution video.

12. The apparatus of claim 11, wherein the coder further comprises:
a de-quantizer configured to de-quantize the quantized signal from the quantizer;
a second combiner configured to combine the de-quantized signal from the de-quantizer and the compensated final motion vector from the motion vector compensator; and
a frame memory configured to store the combined signal from the second combiner as the second reference frame for compensating motion vector of a next frame.

13. The method of claim 5, wherein the converting comprises:
decoding and de-quantizing the first resolution video signal into a de-quantized video signal; and converting the de-quantized video signal into the second resolution according to the predetermined ratio.

14. The method of claim 6, wherein the coding comprises:
compensating the final motion vector at a DCT region based on a second reference frame;
combining and quantizing the compensated final motion vector and the decoded signal; and
coding the quantized signal into a second resolution video.

15. The method of claim 14, wherein the coding further comprises:
dequantizing the quantized signal;
combining the compensated final motion vector and the de-quantized signal; and
storing the combined signal as a second reference frame for compensating a final motion vector for a next frame.

16. The apparatus of claim 8, further comprising:
a second motion vector compensator, provided within the coding unit, configured to receive the calculated final motion vector from the motion vector re-sampler and to compensate the final motion vector at a DCT region based on a third reference frame;
a second combiner configured to combine the compensated signal from the second motion vector compensator and the combined signal from the first combiner;
a quantizer configured to quantize the combined signal from the second combiner; and
a variably length coder configured to code the quantized signal from the quantizer into a converted resolution video.

17. The apparatus of claim 16, further comprising:
a second de-quantizer configured to de-quantize the quantized signal from the quantizer;
a third combiner configured to combine the de-quantized signal from the second de-quantizer and the compensated final motion vector from the second motion vector compensator; and
a second frame memory configured to store the combined signal from the third combiner as a fourth reference frame for compensating a motion vector of a next frame.

18. The method of claim 10, further comprising:
compensating the final motion vector based on a stored third reference frame;
combining and quantizing the compensated final motion vector and the second resolution coding signal; and
coding the quantized signal to a second resolution video.

19. The method of claim 18, further comprising:
de-quantizing the quantized signal;
combining the compensated final motion vector and the de-quantized signal; and
storing the combined signal as a fourth reference frame for compensating a final motion vector for a next frame.

* * * * *